US012764792B2

(12) United States Patent
Kim

(10) Patent No.: US 12,764,792 B2
(45) Date of Patent: Oct. 13, 2026

(54) METHOD AND DEVICE FOR LOW LATENCY COMMUNICATION IN WIRELESS LOCAL AREA NETWORK

(71) Applicants: Hyundai Motor Company, Seoul (KR); Kia Corporation, Seoul (KR); Korea National University of Transportation Industry-Academic Cooperation Foundation, Chungju (KR)

(72) Inventor: Yong Ho Kim, Incheon (KR)

(73) Assignees: Hyundai Motor Company, Seoul (KR); Kia Corporation, Seoul (KR); Korea National University of Transportation Industry—Academic Cooperation Foundation, Chungju (KR)

(*) Notice: Subject to any disclaimer, the term of this patent is extended or adjusted under 35 U.S.C. 154(b) by 258 days.

(21) Appl. No.: 18/783,961

(22) Filed: Jul. 25, 2024

(65) Prior Publication Data

US 2024/0381428 A1 Nov. 14, 2024

Related U.S. Application Data

(63) Continuation of application No. PCT/KR2023/001261, filed on Jan. 27, 2023.

(30) Foreign Application Priority Data

Jan. 28, 2022 (KR) ........................ 10-2022-0013589

(51) Int. Cl.

*H04W 74/0816* (2024.01)
*H04W 74/08* (2024.01)
*H04W 84/12* (2009.01)

(52) U.S. Cl.

CPC ... *H04W 74/0816* (2013.01); *H04W 74/0866* (2013.01); *H04W 84/12* (2013.01)

(58) Field of Classification Search

CPC . H04W 28/04; H04W 28/02; H04W 52/0216; H04W 56/00; H04W 56/002;

(Continued)

(56) References Cited

U.S. PATENT DOCUMENTS

2016/0381704 A1 12/2016 Chu et al.
2019/0037595 A1* 1/2019 Cherian .............. H04W 74/006

(Continued)

FOREIGN PATENT DOCUMENTS

CN 117082645 A * 11/2023 ............ H04W 76/15
KR 10-2020-0013017 A 2/2020

(Continued)

OTHER PUBLICATIONS

A. Lopez-Raventos et al., "Multi-link Operation in IEEE 802.1 1 be WLANs", arXiv:2201.07499v1. Jan. 19, 2022 (retrieved on Apr. 26, 2023—from <https://arxiv.org/pdf/2201.07499.pdf>.

*Primary Examiner* — Shean Tokuta
(74) *Attorney, Agent, or Firm* — Fox Rothschild LLP

(57) ABSTRACT

A method and a device are operable utilizing a wireless local area network (LAN) for low latency communication. A method of operating a station (STA) multi-link device (MLD) in the wireless LAN includes steps of: receiving, by a processor of the station, from a first access point (AP) in a first link, a first frame including information about a first restricted target wake time (rTWT) service period (SP) configured in the first link and information about a second rTWT SP configured in a second link; and receiving, by the processor, from a second AP, a data frame in the second rTWT SP of the second link if reception of the data frame in the first rTWT SP of the first link fails.

20 Claims, 7 Drawing Sheets

(58) Field of Classification Search
CPC ......... H04W 72/1263; H04W 74/0816; H04W 74/0866; H04W 76/15; H04W 84/12; Y02D 30/70
See application file for complete search history.

(56) References Cited

U.S. PATENT DOCUMENTS

| | | | | |
|---|---|---|---|---|
| 2019/0289625 | A1 | 9/2019 | Kwon et al. | |
| 2021/0377856 | A1 | 12/2021 | Chu et al. | |
| 2022/0029736 | A1* | 1/2022 | Chu | H04L 1/0025 |
| 2022/0141680 | A1* | 5/2022 | Min | H04W 24/02 |
| 2022/0386372 | A1* | 12/2022 | Xin | H04L 27/0006 |
| 2023/0049552 | A1* | 2/2023 | Chitrakar | H04L 9/0637 |
| 2023/0058871 | A1* | 2/2023 | Xin | H04W 52/0258 |
| 2023/0128915 | A1* | 4/2023 | Kim | H04W 72/12 370/329 |
| 2024/0147318 | A1* | 5/2024 | Khandavalli | H04W 36/0069 |
| 2024/0381428 | A1* | 11/2024 | Kim | H04W 28/02 |
| 2025/0031242 | A1* | 1/2025 | Ryu | H04W 52/028 |
| 2025/0063619 | A1* | 2/2025 | Kim | H04W 76/15 |

FOREIGN PATENT DOCUMENTS

| | | | | | |
|---|---|---|---|---|---|
| KR | 20230116723 | A | * | 8/2023 | H04W 52/0216 |
| WO | 2021/002617 | A1 | | 1/2021 | |
| WO | WO-2023077005 | A1 | * | 5/2023 | H04W 74/0833 |
| WO | WO-2023146339 | A1 | * | 8/2023 | H04W 52/0216 |
| WO | WO-2024190715 | A1 | * | 9/2024 | H04W 76/15 |
| WO | WO-2025112069 | A1 | * | 6/2025 | H04W 72/512 |

* cited by examiner

METHOD AND DEVICE FOR LOW LATENCY COMMUNICATION IN WIRELESS LOCAL AREA NETWORK

CROSS-REFERENCE TO RELATED APPLICATIONS

The present application is a continuation of International Application No. PCT/KR2023/001261 filed on Jan. 27, 2023, which claims under 35 U.S.C. § 119 (a) the benefit of Korean Patent Application No. 10-2022-0013589 filed on Jan. 28, 2022, the entire contents of which are incorporated by reference herein.

BACKGROUND

(a) Technical Field

The present disclosure relates to a wireless local area network (LAN) communication technique, and more particularly, to a low-latency communication technique for transmitting time-sensitive data.

(b) Description of the Related Art

Recently, along with the spread of mobile devices, a wireless local area network technology capable of providing fast wireless communication services to mobile devices is also required. The wireless LAN technology may be a technology that supports mobile devices such as smart phones, smart pads, laptop computers, portable multimedia players, embedded devices, and the like to wirelessly access the Internet based on wireless communication technology.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

Improvements to the conventional carrier sensing multiple access/collision avoidance (CSMA) scheme may be required for low-latency operations in a wireless LAN. To transmit data based on the CSMA scheme, a communication node may check whether a channel is in an idle state by performing a channel access procedure. When the channel is in the idle state, the communication node may transmit data. That is, the communication node may compete with other communication nodes to transmit data. Since it takes time due to competition, there may be limitations in quickly transmitting data.

Meanwhile, the technologies that are the background of the present disclosure are written to improve the understanding of the background of the present disclosure and may include content that is not already known to those of ordinary skill in the art to which the present disclosure belongs.

SUMMARY

The present disclosure is directed to a method and an apparatus for low-latency communication in a wireless LAN.

A method of operating a station (STA) multi-link device (MLD), according to a first exemplary embodiment of the present disclosure for achieving the above-described objective, may comprise: receiving, by a processor of the station, from a first access point (AP) and on a first link, a first frame including information on a first restricted target wake time (rTWT) service period (SP) configured on the first link and information on a second rTWT SP configured on a second link; and in response to a failure of receiving a data frame in the first rTWT SP on the first link, receiving, by the processor, the data frame from a second AP in the second rTWT SP on the second link.

A first STA affiliated with the STA MLD may operate on the first link, a second STA affiliated with the STA MLD may operate on the second link, and the first AP and the second AP may be affiliated with an AP MLD.

The first STA may operate in a normal mode at a start time of the first rTWT SP, and the second STA may operate in the normal mode at a start time of the second rTWT SP.

The information on the first rTWT SP may include at least one of information on a start time of the first rTWT SP or information on a duration of the first rTWT SP, and the information on the second rTWT SP may include at least one of information on a start time of the second rTWT SP or information on a duration of the second rTWT SP.

The first rTWT SP and the second rTWT SP may be configured as different time periods in time domain, and the second rTWT SP may be a replacement rTWT SP for the first rTWT SP.

The method may further comprise: after reception of the data frame in the second rTWT SP is completed, receiving, from the second AP and on the second link, a second frame indicating termination of the second rTWT SP.

The first frame may be a TWT response frame or a beacon frame.

A method of operating an access point (AP) MLD, according to a second exemplary embodiment of the present disclosure for achieving the above-described objective, may comprise: transmitting, by a processor of the access point, to a first station (STA) and on a first link, a first frame including information on a first restricted target wake time (rTWT) service period (SP) configured on the first link and information on a second rTWT SP configured on a second link; and in response to a failure of transmitting a data frame in the first rTWT SP on the first link, transmitting, by the processor, the data frame to a second STA in the second rTWT SP on the second link.

A first AP affiliated with the AP MLD may operate on the first link, a second AP affiliated with the AP MLD may operate on the second link, and the first STA and the second STA may be affiliated with a STA MLD.

The information on the first rTWT SP may include at least one of information on a start time of the first rTWT SP or information on a duration of the first rTWT SP, and the information on the second rTWT SP may include at least one of information on a start time of the second rTWT SP or information on a duration of the second rTWT SP.

The first rTWT SP and the second rTWT SP may be configured as a same time period in time domain, and the second rTWT SP may be a replacement rTWT SP for the first rTWT SP.

The method may further comprise: after transmission of the data frame in the second rTWT SP is completed, transmitting, to the second STA and on the second link, a second frame indicating termination of the second rTWT SP.

The first frame may be a TWT response frame or a beacon frame.

A STA MLD, according to a third exemplary embodiment of the present disclosure for achieving the above-described objective, may comprise a processor, and the processor may cause the STA MLD to perform: receiving, by the processor, from a first access point (AP) and on a first link, a first frame including information on a first restricted target wake time (rTWT) service period (SP) configured on the first link and information on a second rTWT SP configured on a second link; and in response to a failure of receiving a data frame in the first rTWT SP on the first link, receiving, by the processor, the data frame from a second AP in the second rTWT SP on the second link.

A first STA affiliated with the STA MLD may operate on the first link, a second STA affiliated with the STA MLD may operate on the second link, and the first AP and the second AP may be affiliated with an AP MLD.

The first STA may operate in a normal mode at a start time of the first rTWT SP, and the second STA may operate in the normal mode at a start time of the second rTWT SP.

The information on the first rTWT SP may include at least one of information on a start time of the first rTWT SP or information on a duration of the first rTWT SP, and the information on the second rTWT SP may include at least one of information on a start time of the second rTWT SP or information on a duration of the second rTWT SP.

The first rTWT SP and the second rTWT SP may be configured as a same time period in time domain, and the second rTWT SP may be a replacement rTWT SP for the first rTWT SP.

The processor may further cause the STA MLD to perform: after reception of the data frame in the second rTWT SP is completed, receiving, from the second AP and on the second link, a second frame indicating termination of the second rTWT SP.

The first frame may be a TWT response frame or a beacon frame.

According to the present disclosure, multiple service periods can be configured, and among these periods, a specific service period may be utilized for low-latency communication. A communication node participating in low-latency communication can perform transmission and reception operations of data frames within the specific service period (e.g., low-latency service period). If transmission of a data frame fails in a first service period, the communication node can transmit the data frame in a second service period. Consequently, low-latency requirements in wireless LANs can be satisfied, and communication performance can be enhanced.

DETAILED DESCRIPTION

Figure 1:
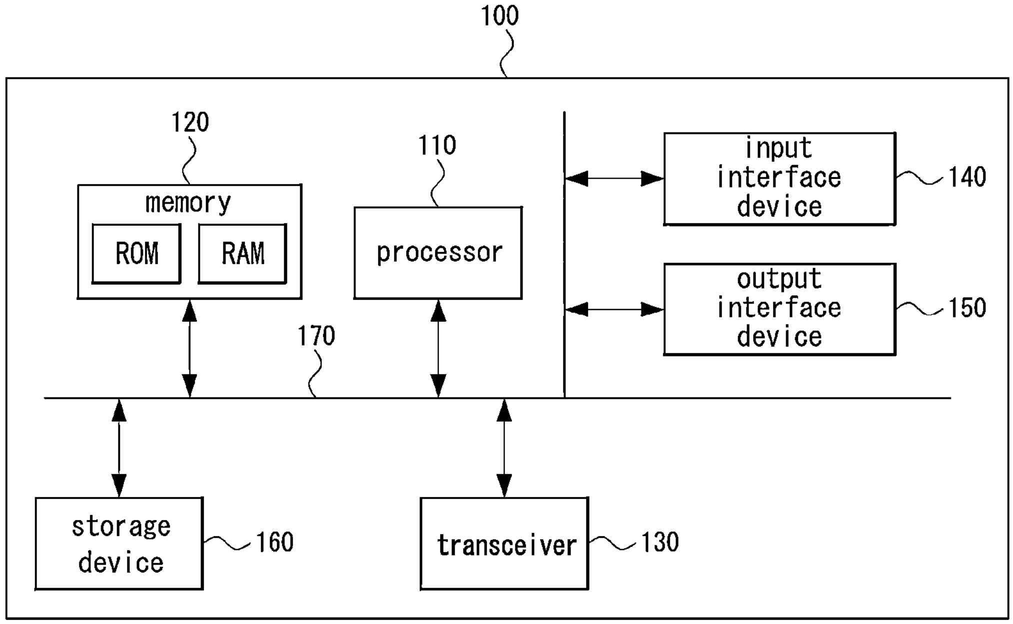
FIG. 1 is a block diagram illustrating a first exemplary embodiment of a communication node constituting a wireless LAN system.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN). Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

In the following, a wireless communication system to which exemplary embodiments according to the present disclosure are applied will be described. The wireless communication system to which the exemplary embodiments according to the present disclosure are applied is not limited to the contents described below, and the exemplary embodiments according to the present disclosure can be applied to various wireless communication systems. A wireless communication system may be referred to as a 'wireless communication network'.

In exemplary embodiments, 'configuration of an operation (e.g., transmission operation)' may mean that 'configuration information (e.g., information element(s), parameter (s)) for the operation' and/or 'information indicating to perform the operation' is signaled. 'Configuration of an information element (e.g., parameter)' may mean that the information element is signaled. 'Configuration of a resource (e.g., resource region)' may mean that setting information of the resource is signaled.

FIG. 1 is a block diagram illustrating a first exemplary embodiment of a communication node constituting a wireless LAN system.

As shown in FIG. 1, a communication node 100 may be an access point, a station, an access point (AP) multi-link device (MLD), or a non-AP MLD. An access point may refer to 'AP', and a station may refer to 'STA' or 'non-AP STA'. An operating channel width supported by an AP may be 20 megahertz (MHz), 80 MHz, 160 MHz, or the like. An operating channel width supported by a STA may be 20 MHz, 80 MHz, or the like.

The communication node 100 may include at least one processor 110, a memory 120, and a transceiver 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The respective components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute program commands stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
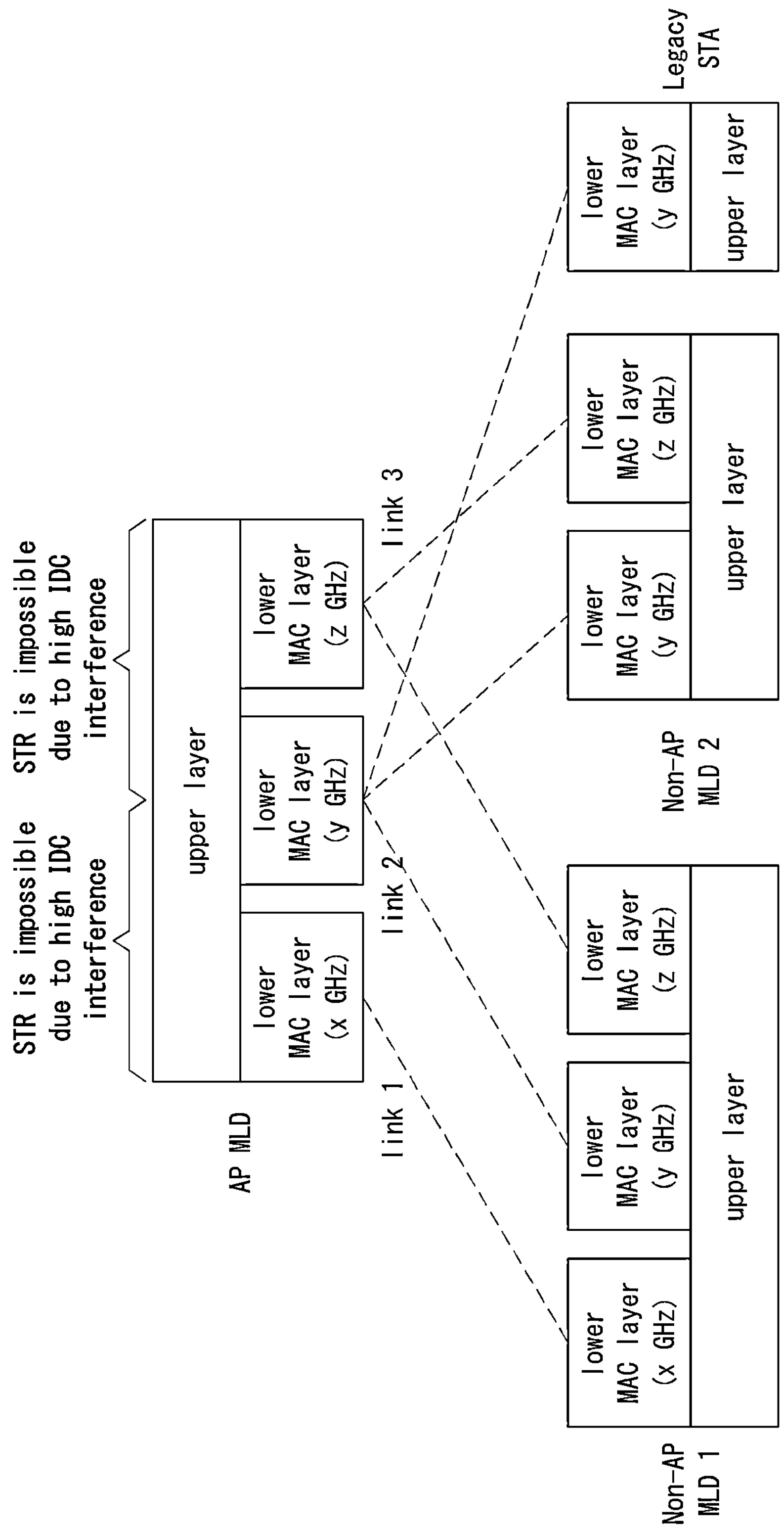
FIG. 2 is a conceptual diagram illustrating a first exemplary embodiment of a multi-link configured between multilink devices (MLDs).

FIG. 2 is a conceptual diagram illustrating a first exemplary embodiment of a multi-link configured between multi-link devices (MLDs).

As shown in FIG. 2, an MLD may have one medium access control (MAC) address. In exemplary embodiments, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) affiliated with the non-AP MLD may have different MAC addresses. Each of the APs having different MAC addresses within the AP MLD may be in charge of each link, and may perform a role of an independent AP.

Each of the STAs having different MAC addresses within the non-AP MLD may be in charge of each link, and may perform a role of an independent STA. The non-AP MLD may be referred to as a STA MLD. The MLD may support a simultaneous transmit and receive (STR) operation. In this case, the MLD may perform a transmission operation in a link 1 and may perform a reception operation in a link 2. The MLD supporting the STR operation may be referred to as an STR MLD (e.g., STR AP MLD, STR non-AP MLD). In exemplary embodiments, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links by using a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 1). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 1).

The MLD may perform communications in multiple bands (i.e., multi-band). For example, the MLD may perform communications using an 80 MHz bandwidth according to a channel expansion scheme (e.g., bandwidth expansion scheme) in a 2.4 GHz band, and perform communications using a 160 MHz bandwidth according to a channel expansion scheme in a 5 GHz band. The MLD may perform communications using a 160 MHz bandwidth in the 5 GHz band, and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, each link may be referred to as a link 1, a link 2, a link 3, or the like. A link number may be set by an access point, and an identifier (ID) may be assigned to each link.

The MLD (e.g., AP MLD and/or non-AP MLD) may configure a multi-link by performing an access procedure and/or a negotiation procedure for a multi-link operation. In this case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may be connected to one or more links of the multi-link supported by the AP MLD.

When a band separation between multiple links (e.g., a band separation between a link 1 and a link 2 in the frequency domain) is sufficient, the MLD may be able to perform an STR operation. For example, the MLD may transmit a physical layer convergence procedure (PLCP) protocol data unit (PPDU) 1 using the link 1 among multiple links, and may receive a PPDU 2 using the link 2 among multiple links. On the other hand, if the MLD performs an STR operation when the band separation between multiple links is not sufficient, in-device coexistence (IDC) interference, which is interference between the multiple links, may occur. Accordingly, when the bandwidth separation between multiple links is not sufficient, the MLD may not be able to perform an STR operation. A link pair having the above-described interference relationship may be a non-simultaneous transmit and receive (NSTR)-limited link pair. Here, the MLD may be referred to as 'NSTR AP MLD' or 'NSTR non-AP MLD'.

For example, a multi-link including a link 1, a link 2, and a link 3 may be configured between an AP MLD and a non-AP MLD 1. When a band separation between the link 1 and the link 3 is sufficient, the AP MLD may perform an STR operation using the link 1 and the link 3. That is, the AP MLD may transmit a frame using the link 1 and receive a frame using the link 3. When a band separation between the link 1 and the link 2 is insufficient, the AP MLD may not be able to perform an STR operation using the link 1 and the link 2. When a band separation between the link 2 and the link 3 is not sufficient, the AP MLD may not be able to perform an STR operation using the link 2 and the link 3.

Meanwhile, in a wireless LAN system, a negotiation procedure for a multi-link operation may be performed in an access procedure between a station and an access point. A device (e.g., access point, station) that supports multiple links may be referred to as 'multi-link device (MLD)'. An access point supporting multiple links may be referred to as 'AP MLD', and a station supporting multiple links may be referred to as 'non-AP MLD' or 'STA MLD'. The AP MLD may have a physical address (e.g., MAC address) for each link. The AP MLD may be implemented as if an AP in charge of each link exists separately. A plurality of APs may be managed within one AP MLD. Therefore, coordination between a plurality of APs belonging to the same AP MLD may be possible. A STA MLD may have a physical address (e.g., MAC address) for each link. The STA MLD may be implemented as if a STA in charge of each link exists separately. A plurality of STAs may be managed within one STA MLD. Therefore, coordination between a plurality of STAs belonging to the same STA MLD may be possible.

For example, an AP1 of the AP MLD and a STA1 of the STA MLD may each be responsible for a first link and perform communication using the first link. An AP2 of the AP MLD and a STA2 of the STA MLD may each be responsible for a second link and perform communication using the second link. The STA2 may receive status change information for the first link on the second link. In this case, the STA MLD may collect information (e.g., status change information) received on the respective links, and control operations performed by the STA1 based on the collected information.

Hereinafter, data transmission and reception methods in a wireless LAN system will be described. Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a STA is described, an AP corresponding thereto may perform an operation corresponding to the operation of the STA. Conversely, when an operation of an AP is described, a STA corresponding thereto may perform an operation corresponding to the operation of the AP.

In exemplary embodiments, an operation of a STA may be interpreted as an operation of a STA MLD, an operation of a STA MLD may be interpreted as an operation of a STA, an operation of an AP may be interpreted as an operation of an AP MLD, and an operation of an AP MLD may be interpreted as an operation of an AP. An AP in an AP MLD may refer to an AP affiliated with the AP MLD, and a STA in a STA MLD may refer to a STA affiliated with the STA MLD. In exemplary embodiments, a transmission time of a frame may refer to a transmission start time or a transmission end time, and a reception time of a frame may refer to a reception start time or a reception end time.

Figure 3:
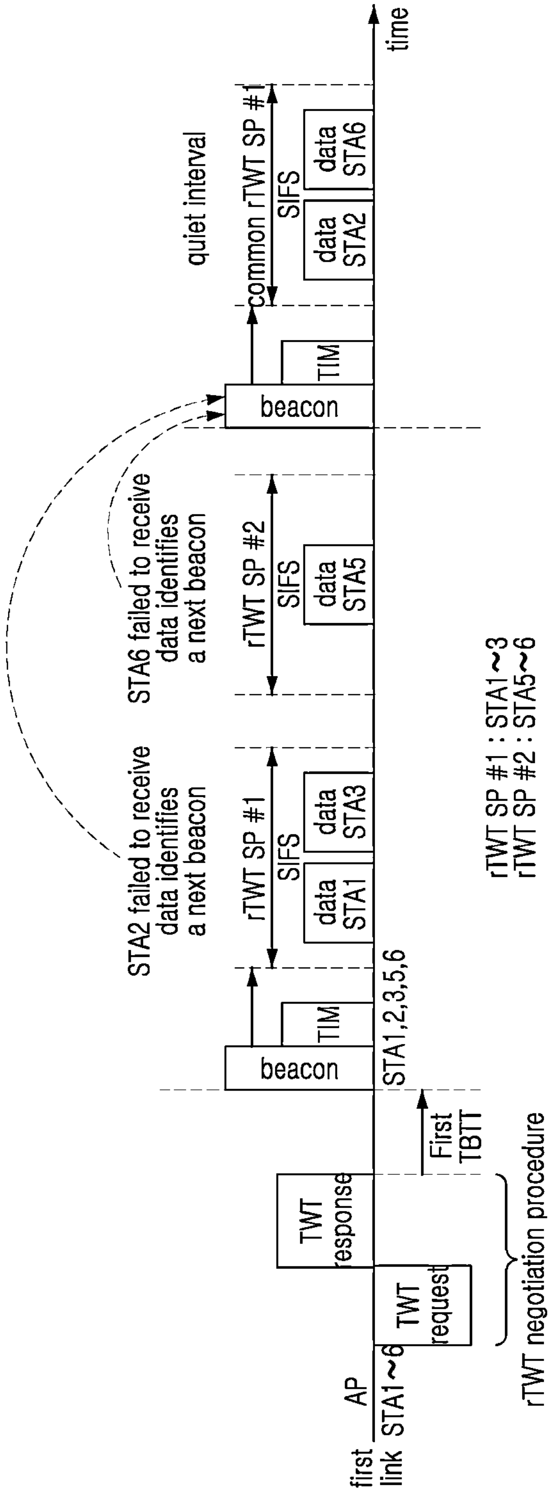
FIG. 3 is a timing diagram illustrating a first exemplary embodiment of a method for configuring a rTWT SP and a communication method in the rTWT SP.

FIG. 3 is a timing diagram illustrating a first exemplary embodiment of a method for configuring a restricted target wake time (rTWT) service period (SP) and a communication method in the rTWT SP.

As shown in FIG. 3, STA(s) may transmit a TWT request frame to an AP on one link (e.g., first link) of a multi-link to perform restricted target wake time (rTWT) operations, and receive a TWT response frame from the AP in response to the TWT request frame. That is, a rTWT negotiation procedure between the STA(s) and the AP may be performed. In the present disclosure, a rTWT (e.g., rTWT SP) may be interpreted as a TWT (e.g., TWT SP), the TWT request frame may refer to a rTWT request frame, and the TWT response frame may refer to a rTWT response frame. Before the STA(s) transmit the TWT request frame to the AP to perform the rTWT operations, the AP may announce the rTWT SP to the STA(s) using a broadcast TWT element of a beacon frame. In the rTWT negotiation procedure, a STA may be configured as a rTWT member, and may obtain at least one of information on an identifier (ID) of the rTWT, a transmission time (e.g., first target beacon transmission time (TBTT)) of a beacon frame including rTWT SP information, information on a periodicity of the beacon frame including the rTWT SP information, or information on a listening interval for the rTWT SP.

In the rTWT negotiation procedure, the AP may configure a STA as a rTWT member and assign two or more rTWT IDs to the STA (e.g., rTWT member). The rTWT IDs assigned by the AP may be classified into two types. The first type of rTWT ID may be a member-only rTWT ID. If specific STAs are rTWT members, member-only rTWT IDs may be assigned to the specific STAs. A member-only rTWT (e.g., member-only rTWT SP) associated with the member-only rTWT IDs may be configured. The second type of rTWT ID may be a common rTWT ID. A common rTWT (e.g., common rTWT SP) associated with the common rTWT ID may be configured. STA(s) that satisfy specific condition(s) may perform common rTWT operations.

The STA(s) may receive a beacon frame from the AP regardless of the type of rTWT (e.g., rTWT ID), and identify whether a rTWT ID included in the beacon frame is the same as the rTWT ID assigned to the corresponding STA(s). The STA may identify the common rTWT SP associated with the common rTWT ID if the following condition(s) are satisfied.

Condition 1: A traffic indication map (TIM) included in the AP's beacon frame indicates that a bufferable unit (BU) to be transmitted to the STA exists in the AP.

Condition 2: The STA does not receive a BU in the member-only rTWT SP

The common rTWT SP may be allocated as needed. Therefore, some of information elements for a general rTWT may be omitted in the rTWT negotiation procedure. For example, the AP may only inform the STA(s) of the common rTWT ID. The STA(s) may determine whether a rTWT ID is a general rTWT ID (e.g., member-only rTWT ID) or a common rTWT ID based on the information element(s) received from the AP in the rTWT negotiation procedure. If specific information element(s) are not received from the AP, the STA(s) may determine that the rTWT ID is a general rTWT ID or a common rTWT ID. Alternatively, if specific information element(s) are received from the AP, the STA(s) may determine that the rTWT ID is a general rTWT ID or a common rTWT ID.

The STA may receive the beacon frame including rTWT information from the AP using rTWT-related information obtained in the rTWT negotiation procedure, obtain the rTWT information included in the beacon frame, and perform communication with the AP during a rTWT SP indicated by the rTWT information. The rTWT information may be referred to as rTWT configuration information, rTWT SP information, or rTWT SP configuration information. The STA may perform communication by operating in a normal mode (e.g., an awake state and/or a state in which a power management (PM) bit of a MAC header is set to 0) in a beacon frame reception period. The STA may operate in a power saving mode (e.g., a doze state and/or a state in which the PM bit of the MAC header is set to 1) in periods other than the beacon frame reception period and the rTWT SP. That is, an operating mode of the STA may transition from the normal mode to the power saving mode. In the power saving mode, the STA may not perform communication. Alternatively, in the power saving mode, the STA may perform only essential communications (e.g., reception operation of beacon frames). The PM bit in the MAC header being set to 0 may indicate that the STA is in an active mode. The PM bit in the MAC header being set to 1 may indicate that the STA is in the power saving (PS) mode. The above-described operation of the STA in the normal mode and the power saving mode may be applied in exemplary embodiments to be described later.

The STA may listen to a beacon frame including the rTWT information based on a first TBTT obtained in the rTWT negotiation procedure. The beacon frame broadcast by the AP may include the rTWT information. The rTWT information may include at least one of an rTWT ID, information on a start time of the rTWT SP, or information on a duration of the rTWT SP. The beacon frame may include a quiet element that prevents STA(s) from communicating during the rTWT SP. A quiet interval may be configured by the quiet element, and the STA(s) may not perform communication in the quiet interval. In the time domain, the quiet interval may be configured to include the rTWT SP. Alternatively, in the time domain, the quiet interval may be configured to partially overlap with the rTWT SP. The quiet element may be referred to as a quiet element field or a quiet element format. Since a STA, which is a rTWT member, is able to perform communication during the rTWT SP, it may ignore the quiet interval indicated by the quiet element. The STA may identify the rTWT information included in the beacon frame (e.g., information on the start time of the rTWT SP and/or information on the duration of the rTWT SP) and communicate with the AP in the rTWT SP indicated by the rTWT information.

The STA may identify whether data (e.g., BU) to be transmitted to the STA exists in the AP based on a traffic indication map (TIM) (e.g., TIM element) included in the beacon frame. The TIM may include a partial virtual bitmap. If a bit corresponding to the STA's association identifier (AID) among bits included in the TIM (e.g., partial virtual bitmap) is set to a first value (e.g., 1), the STA may determine that a BU (e.g., packet, data) to be transmitted to the STA exists in the AP. If the bit corresponding to the STA's AID among the bits included in the TIM (e.g., partial virtual bitmap) is set to a second value (e.g., 0), the STA may determine that a BU to be transmitted to the AP does not exist in the AP.

The STA may operate in the normal mode during the rTWT SP indicated by the beacon frame, and wait to receive the BU in the rTWT SP. The operating mode of the STA may transition from the power saving mode to the normal mode at a start time of the rTWT SP (or before the start time of the rTWT SP). Even if there are many existing STAs in the rTWT SP that do not support rTWT operations and/or operations according to the quiet element, existing STA(s) that are not rTWT members may perform data frame transmission and reception operations in the rTWT SP. The rTWT member may be referred to as a member STA, and the existing STA that is not a rTWT member may be referred to as a non-member STA. The non-member STA(s) may perform channel contention operations to transmit a data frame. In this case, the AP's channel access operation (e.g., backoff operation) may fail, and the AP may not transmit a BU to the rTWT member (e.g., member STA) in the rTWT SP. Although the STA (e.g., member STA) determines that a BU for the STA exists in the AP based on the TIM included in the beacon frame, the STA may not receive the BU from the AP in the rTWT SP. In this case, the BU may be transmitted in the common rTWT SP associated with the common rTWT ID assigned in the rTWT negotiation procedure, and thus the STA may identify the common rTWT SP. That is, if transmission of the data frame in the rTWT SP (e.g., member-only rTWT SP) fails, the AP may transmit the data frame in the common rTWT SP. Therefore, the STA may receive the data frame in the common rTWT SP instead of the rTWT SP.

The AP may not be able to deliver BUs (e.g., data frames) to the STA(s) in the member-only rTWT SP. In this case, the AP may configure a common rTWT SP to the STA(s) using a next beacon frame. The STA(s) may receive the beacon frame from the AP and identify the common rTWT SP indicated by the beacon frame. The beacon frame may include a TIM, and a partial virtual bitmap corresponding to the STA(s) that did not receive BUs in the previous member-only rTWT SP(s) may be configured in the TIM. The STA may identify that a BU to be transmitted to the STA exists within the current beacon period based on the TIM (e.g., partial virtual bitmap) obtained from the AP. The AP's beacon frame may include a quiet element, and the quiet element may be used to prohibit communication by other STA(s) that do not receive the BU in the common rTWT SP. The quiet interval may be configured by the quiet element, and the quiet interval may include the common rTWT SP. If the STA does not receive a BU in the previous member-only rTWT SP, the STA may perform a listening operation in the common rTWT SP. That is, the operating mode of the STA may transition from a low power mode (e.g., power saving mode) to the normal mode in the common rTWT SP.

In the exemplary embodiment of FIG. 3, the STA1, STA2, and STA3 may be member STAs of the rTWT SP #1, and the STA5, STA6, and STA7 may be member STAs of the rTWT SP #2. The rTWT SP #1 and rTWT SP #2 may be member-only rTWT SPs. In the rTWT negotiation procedure, rTWT IDs (e.g., rTWT #1 or rTWT #2) may be assigned to the STA(s). In addition, a common rTWT ID (e.g., common rTWT #1) may also be assigned to the STA(s) in the rTWT negotiation procedure. The AP may transmit a beacon frame including information on the rTWT SP #1 and information on the rTWT SP #2. The STA(s) may receive the AP's beacon frame and identify the information on the rTWT SP #1 and/or rTWT SP #2 included in the beacon frame. The STA(s) may identify a TIM included in the beacon frame. The TIM may indicate that BU(s) to be transmitted to the STA1, STA2, STA3, STA5, and STA6 exist in the AP.

The STA1 to STA3 may operate in the normal mode during the rTWT SP #1 to receive BU(s). That is, the STA1 to STA3 may wait to receive BU(s) in the rTWT SP #1. The AP may transmit BU(s) to the STA1 to STA3 in the rTWT SP #1. The STA1 and STA3 may receive BU(s) from the AP in the rTWT SP #1. However, the STA2 may not receive a BU from the AP in the rTWT SP #1. That is, transmission and/or reception of the BU for the STA2 in the rTWT SP #1 may fail. In this case, the STA2 may obtain information on the common rTWT SP #1 in a next beacon period. The beacon frame transmitted by the AP may include information of the common rTWT SP #1. The STA2 may identify a value of a corresponding bit among bits included in the TIM of the beacon frame. If the bit corresponding to the STA2 (e.g., AID of the STA2) among bits included in the TIM is set to a first value (e.g., 1), the STA2 may determine that a BU to be transmitted to itself exists in the AP. Accordingly, the STA2 may wait to receive the BU in the common rTWT SP #1 and may receive the BU from the AP in the common rTWT SP #1.

The STA5 and STA6 may operate in the normal mode during the rTWT SP #2 to receive BUs. That is, the STA5 and STA6 may wait to receive BUs in the rTWT SP #2. The AP may transmit BUs to the STA5 and STA6 in the rTWT SP #2. The STA5 may receive a BU from the AP in the rTWT SP #2. However, the STA6 may not receive a BU from the AP in the rTWT SP #2. That is, transmission and/or reception of the BU for the STA6 in the rTWT SP #2 may fail. In this case, the STA6 may obtain information on the common rTWT SP #1 in a next beacon period. The STA6 may identify a value of a corresponding bit among bits included in the TIM of the beacon frame. If the bit corresponding to the STA6 (e.g., AID of STA6) among the bits included in the TIM is set to a first value (e.g., 1), the STA6 may determine that a BU to be transmitted to itself exists in the AP. Accordingly, the STA6 may wait to receive the BU in the common rTWT SP #1 and may receive the BU from the AP in the common rTWT SP #1. The same common rTWT SP #1 may be allocated to the STA2, a member of the rTWT SP #1, and the STA6, a member of the rTWT SP #2. Therefore, the STA2 and STA6 may operate in the common rTWT SP #1. Alternatively, the STA2 and STA6, which fail to receive the BUs, may receive the BUs in the next rTWT SP. For example, the STA2 may receive the BU in the rTWT SP #2, which is the next rTWT SP. The STA 6 may receive the BU in a rTWT SP #3, which is the next rTWT SP. The rTWT SP #3 may be a rTWT SP for STAs other than the STA1 to STA6. The rTWT SP #3 may be scheduled (e.g., configured) earlier than scheduling of the common rTWT SP #1.

In the above-described exemplary embodiment, the member-only rTWT SP may be configured by at least one of the TWT negotiation procedure or the beacon frame, and the common rTWT SP may be configured by at least one of the TWT negotiation procedure or the beacon frame. For example, both the member-only rTWT SP and the common rTWT SP may be configured in the TWT negotiation procedure. As another method, both the member-only rTWT SP and the common rTWT SP may be configured by the beacon frame. As another method, the member-only rTWT SP may be configured by the TWT negotiation procedure, and the common rTWT SP may be configured by the beacon frame.

Figure 4:
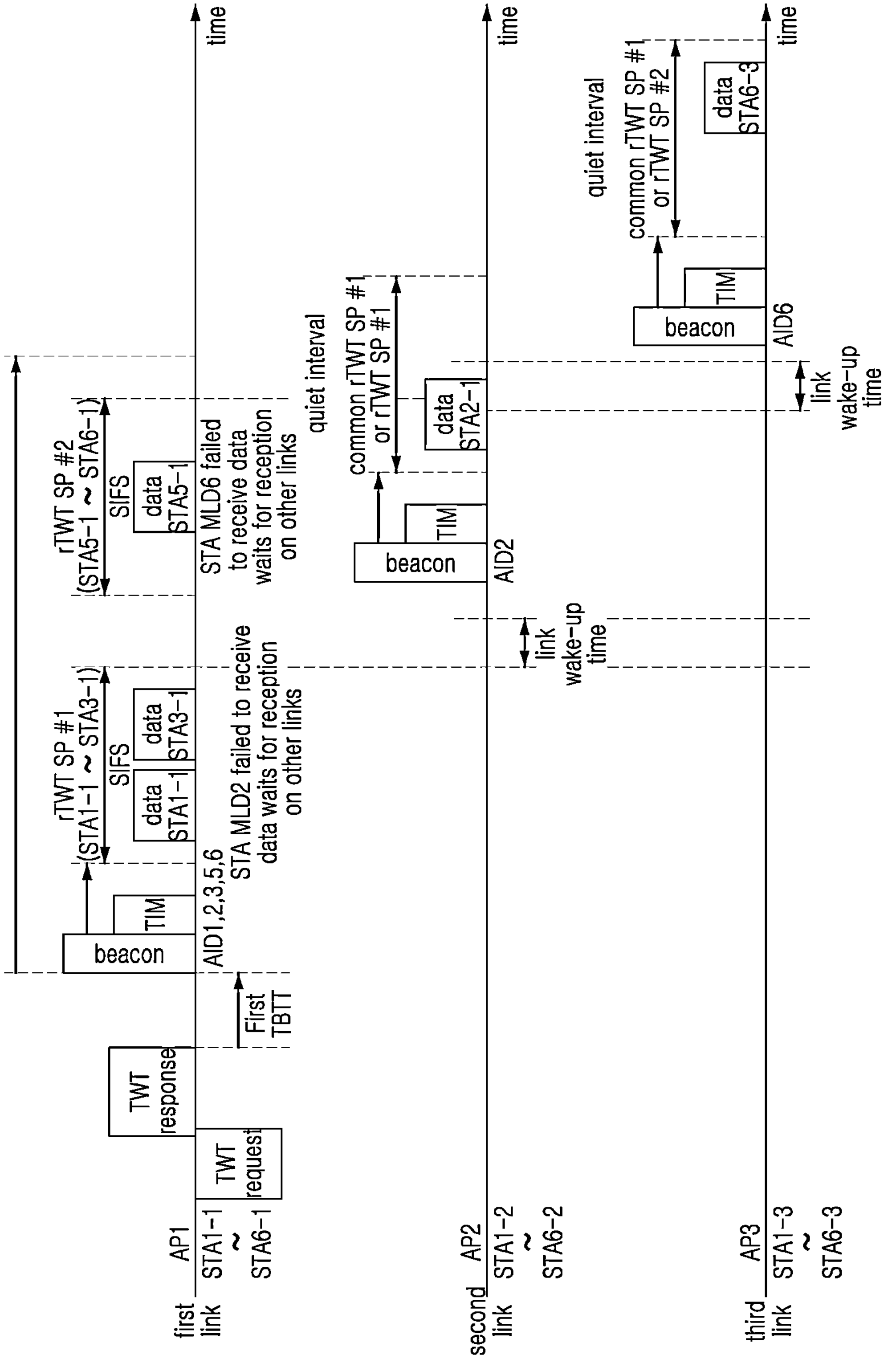
FIG. 4 is a timing diagram illustrating a second exemplary embodiment of a method for configuring a rTWT SP and a communication method in the rTWT SP.

FIG. 4 is a timing diagram illustrating a second exemplary embodiment of a method for configuring a rTWT SP and a communication method in the rTWT SP.

As shown in FIG. 4, a STA1-1, STA1-2, and STA1-3 may be affiliated with a STA MLD1, the STA1-1 may operate on a first link, the STA1-2 may operate on a second link, and the STA1-3 may operate on a third link. A STA2-1, STA2-2, and STA2-3 may be affiliated with a STA MLD2, the STA2-1 may operate on the first link, the STA2-2 may operate on the second link, and the STA2-3 may operate on the third link. A STA3-1, STA3-2, and STA3-3 may be affiliated with a STA MLD3, the STA3-1 may operate on the first link, the STA3-2 may operate on the second link, and the STA3-3 may operate on the third link. A STA4-1, STA4-2, and STA4-3 may be affiliated with a STA MLD4, the STA4-1 may operate on the first link, the STA4-2 may operate on the second link, and the STA4-3 may operate on the third link. A STA5-1, STA5-2, and STA5-3 may be affiliated with a STA MLD5, the STA5-1 may operate on the first link, the STA5-2 may operate on the second link, and the STA5-3 may operate on the third link. A STA6-1, STA6-2, and STA6-3 may be affiliated with a STA MLD6, the STA6-1 may operate on the first link, the STA6-2 may operate on the second link, and the STA6-3 may operate on the third link. An AID1 may indicate the STA MLD1, an AID2 may indicate the STA MLD2, an AID3 may indicate the STA MLD3, an AID4 may indicate the STA MLD4, an AID5 may indicate the STA MLD5, and an AID6 may indicate the STA MLD6. Since an AID is a parameter of a corresponding MLD, the same AID may indicate the same MLD on all links. For example, the AID1 assigned to the STA1-1 may mean that the AID1 is assigned to the STA MLD1 affiliated with the STA1-1. Therefore, the STA1-2 and STA1-3 affiliated with the STA MLD1 may also have the AID1. That is, the AID1 may be used to indicate the STA1-1, STA1-2, and/or STA1-3.

In the exemplary embodiment of FIG. 4, the STAs may perform a negotiation procedure (e.g., rTWT negotiation procedure) for rTWT operations on the first link. The STAs may obtain information on the member-only rTWT SP and/or information on the common rTWT SP from the AP in the rTWT negotiation procedure. Information on the beacon frame including the information on the member-only rTWT SP and/or the information on the common rTWT SP may be obtained in the rTWT negotiation procedure. Operations in the common rTWT SP may be performed when specific condition(s) are satisfied. For example, the STAs may first perform operations in the member-only rTWT SP, and then perform operations in the common rTWT SP when specific condition(s) are satisfied. The member-only rTWT SP and the common rTWT SP may be configured on the same link. Alternatively, the member-only rTWT SP and the common rTWT SP may be configured on different links. For example, the member-only rTWT SP may be configured on the first link, and the common rTWT SP may be configured on the second link and/or the third link.

The STA1-1, STA2-1, and STA3-1 may perform reception operations in a beacon period based on information obtained in the rTWT negotiation procedure to receive information on the rTWT SP #1. The STA1-1, STA2-1, and STA3-1 may receive the beacon frame and obtain the information on the rTWT SP #1 included in the beacon frame. The information on the rTWT SP #1 may include information on a start time of the rTWT SP #1 and/or information on a duration of the rTWT SP #1. The STA4-1, STA5-1, and STA6-1 may perform reception operations in a beacon period based on information obtained in the rTWT negotiation procedure to receive information on the rTWT SP #2. The STA4-1, STA5-1, and STA6-1 may receive the beacon frame and obtain information on the rTWT SP #2 included in the beacon frame.

The information on the rTWT SP #2 may include information on a start time of the rTWT SP #2 and/or information on a duration of the rTWT SP #2. The STAs may identify that BUs for the STAs having the AID1, AID2, AID3, AID5, and AID6 exist in the AP based on a TIM (e.g., TIM element) included in the beacon frame. The AIDs may be assigned to the STAs in association procedures between the STAs and the AP. The STA may identify whether a BU to be transmitted to itself exists based on a value of a bit corresponding to its AID among bits included in the TIM.

The STA1-1, STA2-1, and STA3-1 may operate in the normal mode during the rTWT SP #1. In this case, the STA1-1, STA2-1, and STA3-1 may perform frame transmission and reception operations in the rTWT SP #1. The STA1-1 and STA3-1 may receive BUs (e.g., data frames) in the rTWT SP #1. However, the STA2-1 may not receive a BU in the rTWT SP #1. Transmission and/or reception of the BU for the STA2-1 in the rTWT SP #1 may fail.

The STA MLD2 affiliated with the STA2-1, which fails to receive the BU in the rTWT SP #1, may transition operating mode of other link(s) from the sleep mode to the normal mode to receive the BU in the common rTWT SP allocated in the rTWT negotiation procedure. In the rTWT negotiation procedure, a traffic identifier (TID) mapped to the rTWT (e.g., rTWT SP) may be set. That is, TID-to-link mapping information may be configured. In this case, the STA MLD2 may transition the operating mode of the link(s) mapped to the TID from the power saving mode to the normal mode based on the TID-to-link mapping information. The link operates in the normal mode may mean that STAs operating on the link operate in the normal mode.

A time required for transition of the operating mode may be referred to as a 'link wake-up time'. After a time at which other STA(s) of the STA MLD, affiliated with the STA failing to receive the BU in the member-only rTWT SP, operate in the normal mode, the AP MLD1 may transmit a beacon frame allocating the common rTWT SP. In the exemplary embodiment of FIG. 4, the STA2-1 may not receive a BU in the rTWT SP #1 on the first link. In this case, the STA MLD2 affiliated with the STA2-1 may transition the operating mode of the second link (e.g., STA 2-2 operating on the second link) and the operating mode of the third link (e.g., STA 2-3 operating on the third link) from the power saving mode to the normal mode. Therefore, the STA2-2 may wait to receive a beacon frame on the second link, and the STA2-3 may wait to receive a beacon frame on the third link.

The STA2-2 may receive a beacon frame from the AP2 on the second link, and obtain the information on the common rTWT SP #1 included in the beacon frame. The AP2's beacon frame may include a quiet element to protect the common rTWT SP #1. A quiet interval may be configured by the quiet element, and the quiet interval may include the rTWT SP #1. A TIM included in AP2's beacon frame may indicate that a BU for the AID2 (e.g., STA MLD2) exists. The STA2-2 may identify that a BU for the AID2 exists in the AP2 based on the TIM included in the beacon frame. The STA2-2 may receive the BU from the AP2 in the common rTWT SP #1. The STA2-2 may operate in the normal mode until it receives the beacon frame on the second link, and may operate in the power saving mode in periods other than the common rTWT SP #1 indicated by the beacon frame.

The STA MLD6 (e.g., STA(s) affiliated with the STA MLD6) may operate identically or similarly to the STA MLD2 (e.g., STA(s) affiliated with the STA MLD2). The STA6-3 affiliated with the STA MLD6 may receive a beacon frame from the AP3 on the third link, and may receive a BU from the AP in the common rTWT SP #1 indicated by the beacon frame. If a time at which the second link and the third link operate in the normal mode after termination of the rTWT SP #2 on the first link is before a start time of the common rTWT SP #1 on the second link, the STA MLD6 (e.g., STA6-2) may receive a BU from the AP2 in the common rTWT SP #1 on the second link. In this case, the STA6-2 may wait to receive a beacon frame including information on the common rTWT SP #1, but may receive a BU in the common rTWT SP #1 without receiving the beacon frame. Since the beacon frame is not received, the operating mode of the second link may be maintained in the normal mode continuously from a time of transitioning to the normal mode, and the STA6-2 may receive the BU from the AP in the common rTWT SP #1 on the second link.

In the exemplary embodiment of FIG. 4, the rTWT SP #1 on the first link and the common rTWT SP #1 on the second link may be configured as the same time period in the time domain, and the rTWT SP #2 on the first link and the common rTWT SP #1 on the third link may be configured as the same time period in the time domain. That is, start and end times of the rTWT SP #1 on the first link may be the same as start and end times of the common rTWT SP #1 on the second link, and start and end times of the rTWT SP #2 on the first link may be the same as start and end times of the common rTWT SP #1 on the third link.

If transmission of a data frame (e.g., BU) in the rTWT SP #1 on the first link fails, the AP MLD (e.g., AP2) may transmit the data frame in the common rTWT SP #1 on the second link. If reception of a data frame (e.g., BU) in the rTWT SP #1 on the first link fails, the STA MLD (e.g., STAx-2) may receive the data frame in the common rTWT SP #1 on the second link. In 'STAx', x may be one of 1 to 6. The common rTWT SP #1 on the second link may be a replacement rTWT SP #1 for the rTWT SP #1 on the first link. The replacement rTWT SP #1 may be configured to include the rTWT SP #1 on the first link in the time domain.

If transmission of a data frame (e.g., BU) in the rTWT SP #2 on the first link fails, the AP MLD (e.g., AP3) may transmit the data frame in the common rTWT SP #1 on the third link. If reception of a data frame (e.g., BU) in the rTWT SP #2 on the first link fails, the STA MLD (e.g., STAx-3) may receive the data frame in the common rTWT SP #1 on the third link. In 'STAx', x may be one of 1 to 6. The common rTWT SP #1 on the third link may be a replacement rTWT SP #2 for the rTWT SP #2 on the first link. The replacement rTWT SP #2 may be configured to include the rTWT SP #2 on the first link in the time domain.

As another method, if transmission of a data frame in the rTWT SP #1 or rTWT SP #2 on the first link fails, the AP MLD (e.g., AP1) may transmit the data frame in a next rTWT SP on the first link. For example, the data frame that fails to be transmitted in the rTWT SP #1 may be transmitted in the rTWT SP #2, and the data frame that fails to be transmitted in the rTWT SP #2 may be transmitted in a next rTWT SP #1 or a rTWT SP #3. The STA MLD (e.g., STAx-1) may receive the data frame in the next rTWT SP (e.g., rTWT SP #1, rTWT SP #2, rTWT SP #3) on the first link. In 'STAx-1', x may be one of 1 to 6.

Figure 5:
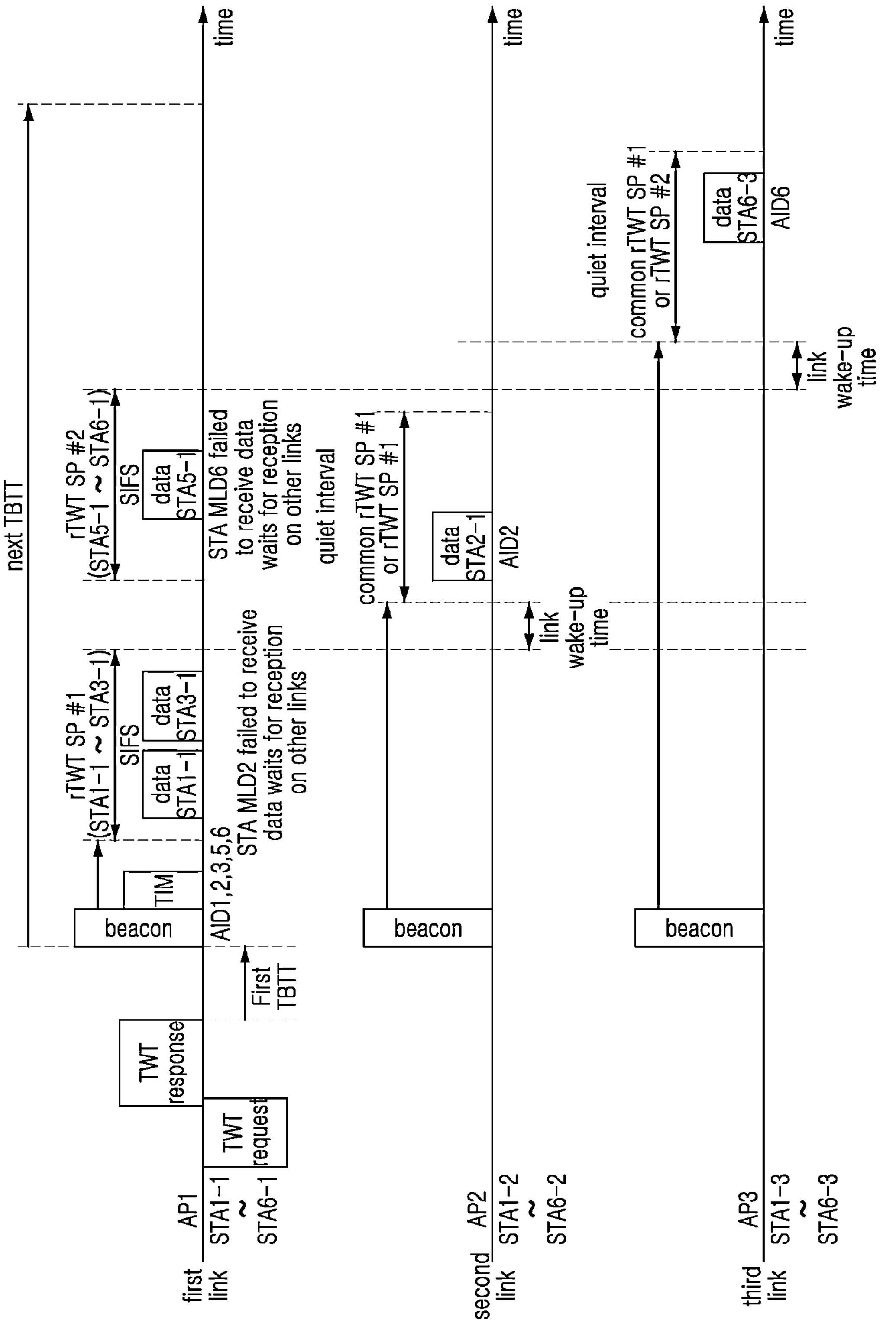
FIG. 5 is a timing diagram illustrating a third exemplary embodiment of a method for configuring a rTWT SP and a communication method in the rTWT SP.

FIG. 5 is a timing diagram illustrating a third exemplary embodiment of a method for configuring a rTWT SP and a communication method in the rTWT SP.

As shown in FIG. 5, beacon periodicities (e.g., transmission times of beacon frames) may be set to be the same or similar on the first to third links. Member-only rTWT SPs may be configured on the first link, and common rTWT SPs may be configured on the second and third links. STA(s) that do not receive BUs in the member-only rTWT SP may receive the BUs in the common rTWT SP. The AP1 of the AP MLD may transmit a beacon frame including information on a rTWT SP #1 and information on a rTWT SP #2 on the first link. The rTWT SP #1 and rTWT SP #2 may be member-only rTWT SPs. The AP2 of the AP MLD may transmit a beacon frame including information on a common rTWT SP #1 on the second link. The AP3 of the AP MLD may transmit a beacon frame including information on the common rTWT SP #1 on the third link.

The common rTWT SP #1 may be protected by a quiet element (e.g., quiet interval). Alternatively, since it is not known whether the common rTWT SP #1 is used, the common rTWT SP #1 may not be protected by the quiet element. The STA MLD2 (e.g., STA2-1) may not receive a BU in the rTWT SP #1 on the first link, and the STA MLD6 (e.g., STA6-1) may not receive a BU in the rTWT SP #2 on the first link. In this case, each of the STA MLD2 and STA MLD6 may transition operating modes of other link(s) to the normal mode, and wait for reception on the other link(s). Each of the STA MLD2 and STA MLD6 may receive the BU from the AP (e.g., AP MLD) in the common rTWT SP #1. In the above-described exemplary embodiment, the common rTWT SP may always be configured on the link, and if reception or transmission of a BU in the member-only rTWT fails, the BU may be re-delivered in the common rTWT SP. The common rTWT SP that is always configured on the link may be referred to as a 'regular common rTWT SP'.

The STA may obtain information on the regular common rTWT SP from the AP in the initial rTWT negotiation procedure (e.g., initial rTWT configuration procedure). Information on the regular common rTWT SP may include information on a start time of the regular common rTWT SP and/or information on a duration of the regular common rTWT SP. The STA MLD may know the regular common rTWT SP in advance. In this case, if an event occurs in which a BU is not received in the member-only rTWT SP, the STA MLD may wait to receive the BU in the regular common rTWT SP configured at the closest time from an occurrence time of the event.

Figure 6:
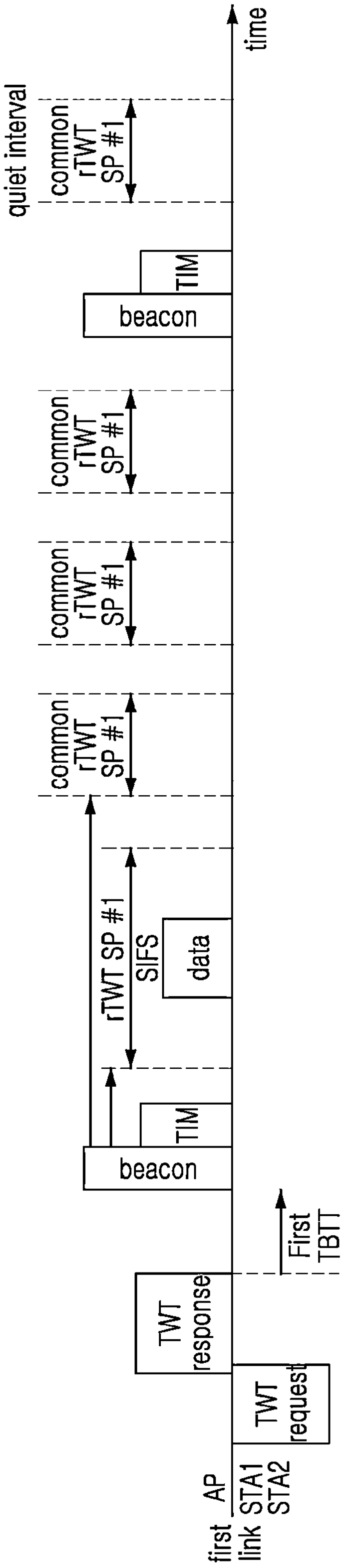
FIG. 6 is a timing diagram illustrating a fourth exemplary embodiment of a method for configuring a rTWT SP and a communication method in the rTWT SP.

FIG. 6 is a timing diagram illustrating a fourth exemplary embodiment of a method for configuring a rTWT SP and a communication method in the rTWT SP.

As shown in FIG. 6, the common rTWT SP may be classified into a regular common rTWT SP and a temporary common rTWT SP. The regular common rTWT SP may be allocated by a beacon frame. The regular common rTWT SP may not be protected by a quiet interval by the quiet element. The regular common rTWT SP that is not protected by the quiet interval may be referred to as an 'unprotected regular common rTWT SP'. One or more unprotected regular common rTWT SPs may be configured within one beacon period. If there is a STA that does not receive a BU in the member-only rTWT SP, an operating mode of the STA may transition from the power saving mode to the normal mode in the unprotected regular common rTWT SP. The STA may receive the BU from the AP in the unprotected regular common rTWT SP. The unprotected regular common rTWT SP may refer to a period in which the STA's operating mode transitions from the power saving mode to the normal mode.

In the rTWT negotiation procedure, the common rTWT ID may be allocated to the STA, and the STA may perform a reception operation of a BU in the member-only rTWT SP according to indication of the TIM. If reception of the BU in the member-only rTWT SP fails, the STA may wait to receive the BU in the common rTWT SP. If there is no STA that does not receive a BU in the member-only rTWT SP, the AP may not occupy the regular common rTWT SP to transmit the BU. Therefore, the regular common rTWT SP may not affect channel congestion. The regular common rTWT SP may not affect transmissions of other STAs that do not perform rTWT operations.

If transmission and/or reception of a BU in the member-only rTWT SP fails, the AP may transmit a beacon frame allocating a temporary common rTWT SP in the next beacon period. The AP may identify that the BU to be transmitted in the common rTWT SP (e.g., temporary common rTWT SP) exists. Therefore, the AP's beacon frame may include a quiet element. A quiet interval for the temporary common rTWT SP may be configured by the quiet element. The quiet interval may be configured to include the temporary common rTWT SP. In the quiet interval, communication by STAs, other than those that did not receive BUs in the previous member-only rTWT SP, may be prohibited. A STA performing a listening operation in the temporary common rTWT SP may be a temporary member STA for the temporary common rTWT SP.

The regular common rTWT SP and the temporary common rTWT SP may be allocated by the beacon frame. The STA may obtain information on the regular common rTWT SP and information on the temporary common rTWT SP from the same beacon frame. A common rTWT ID may be set to be identical to a member-only rTWT ID. If the regular common rTWT SP and the member-only rTWT SP use the same rTWT ID, the STA may obtain information on the rTWT SP for the same rTWT ID from the beacon frame, and identify whether a BU to be transmitted to itself exists based on a TIM included in the beacon frame. Then, the STA may receive the BU in a first-appearing rTWT SP. If reception of the BU in the first-appearing rTWT SP is successful, the STA may not perform a listening operation (e.g., reception operation) in a next rTWT SP configured after the first-appearing rTWT SP. That is, the STA may operate in the power saving mode until a beacon period for a beacon frame including information of the next rTWT SP. The AP may set a more data field to 0 or an EOSP field to 1 in the BU to be transmitted, and transmit the corresponding BU. The BU in which the more data field is set to 0 or the EOSP field is set to 1 may indicate that it is not necessary to perform a listening operation for rTWT SP(s) allocated within this beacon period.

If there are many BUs in the AP and transmission of the BUs is not completed in the member-only rTWT SP, the AP may transmit the remaining BUs in the common rTWT SP. If there is an additional BU to be transmitted to the STA, the AP may set a more data field to 1 or EOSP field to 1 in the BU's MAC header, and transmit the BU in the member-only rTWT SP. Here, the BU may be the last BU in the members-only rTWT SP. The STA may receive the last BU in the member-only rTWT SP and identify the more data field or EOSP field included in the MAC header of the last BU. If the more data field is set to 1 or the EOSP field is set to 0 in the MAC header of the last BU, the STA may perform a reception operation of a BU in the common rTWT SP. When the member-only rTWT SP and the common rTWT SP are configured on the same link, the STA may perform the reception operation of the BU in the common rTWT SP as in the exemplary embodiment of FIG. 6. When the member-only rTWT SP and the common rTWT SP are configured on different links, the STA may perform the reception operation of the BU in the common rTWT SP as in the exemplary embodiment of FIG. 4 or FIG. 5.

Figure 7:
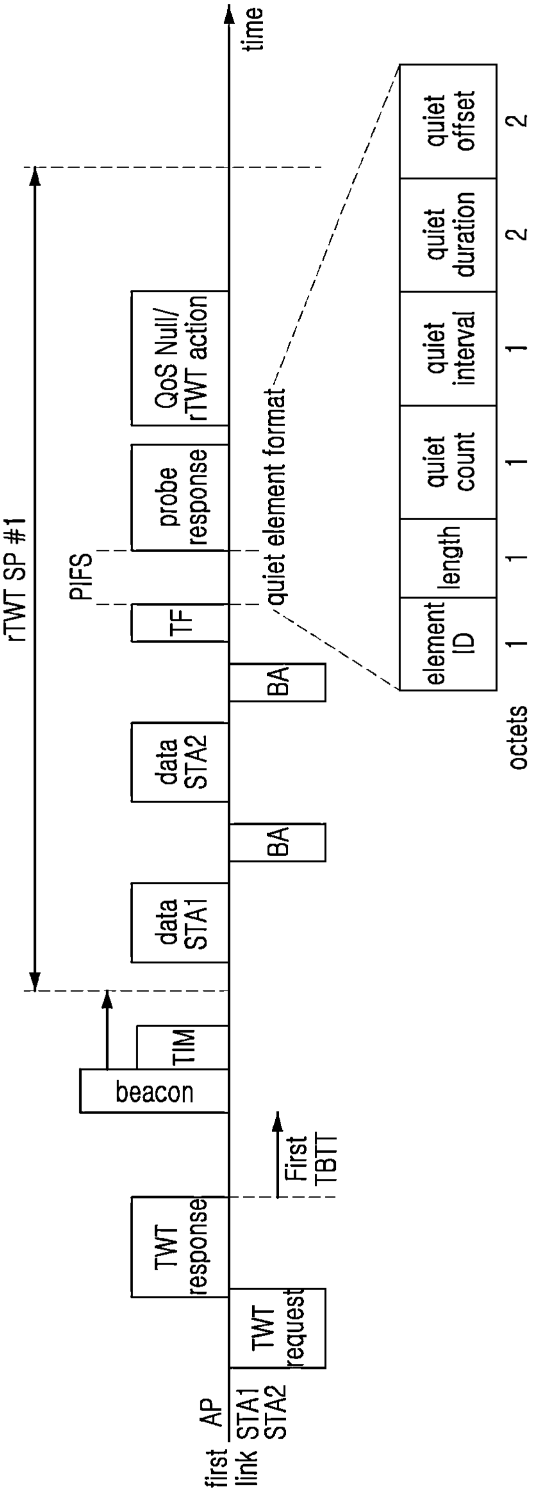
FIG. 7 is a timing diagram illustrating a first exemplary embodiment of a method of early terminating a rTWT SP.

FIG. 7 is a timing diagram illustrating a first exemplary embodiment of a method of early terminating a rTWT SP.

As shown in FIG. 7, a STA other than member STAs (hereinafter referred to as 'non-member STA') may not be able to perform frame transmission and reception operations in a rTWT SP. The STA that supports rTWT operations may receive a beacon frame including information on the rTWT SP, and identify the information on the rTWT SP included in the beacon frame. The non-member STA may terminate frame transmission and reception operations before a start time of the rTWT SP. The non-member STA may not be able to perform frame transmission and reception operations in the rTWT SP. The non-member STA may not support rTWT operations. The non-member STA may perform a quiet element-related processing function. In this case, the non-member STA may identify a quiet element included in the beacon frame received from the AP and may not perform frame transmission/reception operations in a quiet interval configured by the quiet element. The quiet interval may be configured to include the rTWT SP. For example, the quiet interval may be equal to the rTWT SP. Alternatively, the quiet interval may be shorter than the rTWT SP. A minimum quiet interval configured by the quiet element may be longer than the rTWT SP.

In the rTWT SP, communication may be terminated early depending on a presence and/or size of data to be transmitted. When the AP completes transmission of data (e.g., downlink data) in the rTWT SP, the AP may transmit a trigger frame to check whether uplink data exist in the member STAs. The trigger frame may be a MU-RTS trigger frame or a BSRP trigger frame. The trigger frame may be transmitted to all member STAs and may include allocation information (e.g., resource information) for transmission of data. The data triggered by the trigger frame may have a TID for the rTWT SP. If a response frame for the trigger frame is not received, the AP may determine that communication is terminated in the rTWT SP.

The AP may inform member STAs and non-member STAs (e.g., non-member STAs that perform the quiet element-related processing function) of early termination of the rTWT SP. For the member STAs, the AP may broadcast a QoS Null frame that can be received by all STAs (e.g., member STAs). An EOSP field included in a header of the QoS Null frame may be set to 1. The QoS Null frame including the EOSP field set to 1 may indicate termination of the rTWT SP. Alternatively, for the member STAs, the AP may transmit a rTWT action frame that can be received by all STAs (e.g., member STAs). The rTWT action frame may indicate termination of the rTWT SP.

For the non-member STAs (e.g., non-member STAs that perform the quiet element-related processing function), the AP may generate a quiet element including a quiet duration field set to 0 and a quiet offset field set to 0, and broadcast a probe response frame or QoS Null frame including the quiet element. The non-member STAs may receive the probe response frame or QOS Null frame from the AP, identify the quiet element included in the frame, and determine that the quiet interval is terminated based on the quiet element. If the quiet interval includes the rTWT SP, the non-member STAs may determine that the rTWT SP belonging to the quiet interval is terminated. If the frame indicating termination of the rTWT SP or quiet interval is received, the STA may perform communication normally.

As another method, communication in the rTWT SP may be extended depending on a size of data to be transmitted. For example, exchange of uplink and downlink data frames may be performed even after an end time of the rTWT SP, and the exchange of data frames may need to be protected from the non-member STAs. To extend (e.g., configure, change, reconfigure) the quiet interval, the AP may generate a quiet element including a quiet duration field indicating a non-zero value and a quiet offset field indicating a non-zero value, and broadcast a probe response frame or a QoS Null frame including the quiet element. The quiet element may be configured so that the quiet interval further includes a period for the exchange of the data frames expected by the AP. The extension of the quiet interval may be considered as an extension of the rTWT SP. To terminate the extended rTWT SP and terminate the extended quiet interval, the methods described above may be used.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of operating a station (STA) multi-link device (MLD) in a wireless local area network (LAN), the method comprising:

receiving, by a processor of the station, from a first access point (AP) and on a first link, a first frame including information on a first restricted target wake time (rTWT) service period (SP) configured on the first link and information on a second rTWT SP configured on a second link; and in response to a failure of receiving a data frame in the first rTWT SP on the first link, receiving, by the processor, the data frame from a second AP in the second rTWT SP on the second link.

2. The method of claim 1, wherein a first STA affiliated with the STA MLD operates on the first link, a second STA affiliated with the STA MLD operates on the second link, and the first AP and the second AP are affiliated with an AP MLD.

3. The method of claim 2, wherein the first STA operates in a normal mode at a start time of the first rTWT SP, and the second STA operates in the normal mode at a start time of the second rTWT SP.

4. The method of claim 1, wherein the information on the first rTWT SP includes at least one of information on a start time of the first rTWT SP or information on a duration of the first rTWT SP, and the information on the second rTWT SP includes at least one of information on a start time of the second rTWT SP or information on a duration of the second rTWT SP.

5. The method of claim 1, wherein the first rTWT SP and the second rTWT SP are configured as different time periods in time domain, and the second rTWT SP is a replacement rTWT SP for the first rTWT SP.

6. The method of claim 1, further comprising: after reception of the data frame in the second rTWT SP is completed, receiving, from the second AP and on the second link, a second frame indicating termination of the second rTWT SP.

7. The method of claim 1, wherein the first frame is a TWT response frame or a beacon frame.

8. A method of operating an access point (AP) multi-link device (MLD) in a wireless local area network (LAN), the method comprising:

transmitting, by a processor of the access point, to a first station (STA) and on a first link, a first frame including information on a first restricted target wake time (rTWT) service period (SP) configured on the first link and information on a second rTWT SP configured on a second link; and in response to a failure of transmitting a data frame in the first rTWT SP on the first link, transmitting, by the processor, the data frame to a second STA in the second rTWT SP on the second link.

9. The method of claim 8, wherein a first AP affiliated with the AP MLD operates on the first link, a second AP affiliated with the AP MLD operates on the second link, and the first STA and the second STA are affiliated with a STA MLD.

10. The method of claim 8, wherein the information on the first rTWT SP includes at least one of information on a start time of the first rTWT SP or information on a duration of the first rTWT SP, and the information on the second rTWT SP includes at least one of information on a start time of the second rTWT SP or information on a duration of the second rTWT SP.

11. The method of claim 8, wherein the first rTWT SP and the second rTWT SP are configured as a same time period in time domain, and the second rTWT SP is a replacement rTWT SP for the first rTWT SP.

12. The method of claim 8, further comprising: after transmission of the data frame in the second rTWT SP is completed, transmitting, to the second STA and on the second link, a second frame indicating termination of the second rTWT SP.

13. The method of claim 8, wherein the first frame is a TWT response frame or a beacon frame.

14. A station (STA) multi-link device (MLD) in a wireless local area network (LAN), comprising a processor, the station comprising:

receiving, by the processor, from a first access point (AP) and on a first link, a first frame including information on a first restricted target wake time (rTWT) service period (SP) configured on the first link and information on a second rTWT SP configured on a second link; and in response to a failure of receiving a data frame in the first rTWT SP on the first link, receiving, by the processor, the data frame from a second AP in the second rTWT SP on the second link.

15. The STA MLD of claim 14, wherein a first STA affiliated with the STA MLD operates on the first link, a second STA affiliated with the STA MLD operates on the second link, and the first AP and the second AP are affiliated with an AP MLD.

16. The STA MLD of claim 15, wherein the first STA operates in a normal mode at a start time of the first rTWT SP, and the second STA operates in the normal mode at a start time of the second rTWT SP.

17. The STA MLD of claim 14, wherein the information on the first rTWT SP includes at least one of information on a start time of the first rTWT SP or information on a duration of the first rTWT SP, and the information on the second rTWT SP includes at least one of information on a start time of the second rTWT SP or information on a duration of the second rTWT SP.

18. The STA MLD of claim 14, wherein the first rTWT SP and the second rTWT SP are configured as a same time period in time domain, and the second rTWT SP is a replacement rTWT SP for the first rTWT SP.

19. The STA MLD of claim 14, wherein the processor further causes the STA MLD to perform: after reception of the data frame in the second rTWT SP is completed, receiving, from the second AP and on the second link, a second frame indicating termination of the second rTWT SP.

20. The STA MLD of claim 14, wherein the first frame is a TWT response frame or a beacon frame.

* * * * *